US010621552B1

(12) United States Patent
Syed et al.

(10) Patent No.: US 10,621,552 B1
(45) Date of Patent: Apr. 14, 2020

(54) DYNAMICALLY CONTROLLING CASE MODEL STRUCTURE USING CASE FRAGMENTS

(71) Applicant: Open Text Corporation, Waterloo (CA)

(72) Inventors: Ashraf Ali Syed, Bangalore (IN); Sachin Gopaldas Totale, Pleasanton, CA (US); Satyapal Reddy, Fremont, CA (US); Swathi Natarajan, Bangalore (IN); Prasad Thotakura, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 511 days.

(21) Appl. No.: 14/870,459

(22) Filed: Sep. 30, 2015

(51) Int. Cl.
*G06F 16/00* (2019.01)
*G06Q 10/10* (2012.01)

(52) U.S. Cl.
CPC .................... *G06Q 10/103* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,769,115 B1 * | 7/2004 | Oldman | ..................... | G06F 8/36 717/121 |
| 7,395,497 B1 * | 7/2008 | Chaulk | .................. | G06Q 10/00 707/999.001 |
| 7,673,285 B1 * | 3/2010 | Michel | ...................... | G06F 8/45 717/107 |
| 8,494,977 B1 * | 7/2013 | Yehuda | .................. | G06Q 10/00 706/11 |
| 8,813,026 B1 * | 8/2014 | Vobugari | ................ | G06F 17/00 717/104 |
| 9,298,417 B1 * | 3/2016 | Muddu | .................. | G06Q 10/00 |

OTHER PUBLICATIONS

EMC, "Getting Started with xCP 2.0", XCP2.0 Self-Paced Tutorial, Dec. 2012 (207 pages).
"EMC Documentum xCP Designer Help Version 2.0 User Guide", EMC Corporation, 2012 (325 pages).
"EMC Documentum xCelerated Composition Platform Designer Help", Version 2.1 User Guide, EMC Corporation, Corporate Headquarters, Hapkinton, MA, 2009-2014 (373 pages).
"EMC Documentum xCelerated Composition Platform:", Version 2.1 Developer Guide, EMC Corporation, Corporate Headquarters, Hopkinton, MA, 2009-2014 (82 pages).
"JBehave", Writing extual Stories, http://jbehave.org/reference/stable/developing-stories.html#writing, Version 4.0.1 published Jul. 6, 2015 (44 pages).

\* cited by examiner

*Primary Examiner* — Farhan M Syed
(74) *Attorney, Agent, or Firm* — Sprinkle IP Law Group (57) ABSTRACT

Case fragment management includes obtaining a case model definition for a case, and generating a case model from the case model definition. Generating the case model includes obtaining a case fragment expression, executing the case fragment expression using data gathered from a data source to obtain a case fragment identifier, selecting, from multiple case fragments, a case fragment corresponding to the case fragment identifier, and populating the case model with the case fragment. Case fragment management also includes storing the case model.

19 Claims, 8 Drawing Sheets

700
Document Structure for Software
Development Case Model Definition

1) Information (Case Node)

702 Case Fragment A a)     Node: Project Management docs
             i)        Leaf Node: Status Docs
                     (1)      Daily Status Report.xls
                     (2)      Weekly Status Report.xls
             ii)       Leaf Node: Meeting Docs
                     (1)      Weekly Minutes of Meeting.doc     704 Case Fragment B     b)     Node: Design Docs
             i)        Leaf-node: High Level Design
                     (1)      High level architechture.pdf
                     (2)      Component Diagram Model.doc
             ii)       Leaf-Node: Low level design
                     (1)      ComponentA implementation (word doc)
                     (2)      ComponentB implementation (word doc)
                     (3)      ComponentC implementation (word doc)

c)     QA docs (Case Node)
             i)        Integration Testcases (Case Leaf Node)
                     (1)      IntegrationTestCase1 (word doc)
                     (2)      IntegrationTestCase2 (word doc)
             ii)       Sanity Testcases (Case Leaf Node)
                     (1)      SanityTestCase1 (word doc)
                     (2)      SanityTestCase2 (word doc)
             iii)      Regression Testcases (Case Leaf Node)
    d)     Build Docs (Case Node)
    e)     Team member profile (Case Node)

DYNAMICALLY CONTROLLING CASE MODEL STRUCTURE USING CASE FRAGMENTS

BACKGROUND

Case management or management of cases occurs in many sectors of business. A case is a project (e.g., a software development project, building design and construction, car model development and manufacturing, patent application creation and prosecution, and other projects), a grouping of related work (e.g., child protective case), and/or other such collection. A case may involve multiple people to systematically collaborate on a package of content and data in at least a semi-structured way.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the technology are directed to case management. In particular, a case model definition is created for a particular type of case. Rather than including some information directly, the case model definition may reference one or more case fragments. In other words, a case fragment is a portion of a case model definition that may be referenced and used by multiple case model definitions. Thus, when an instance of the case is created, the case model definition is used to create the instance of the case. In creating the instance, the reference to the case fragment(s) is resolved, and the case is managed using information in the case model definition as well as the case fragment definition.

Figure 1:
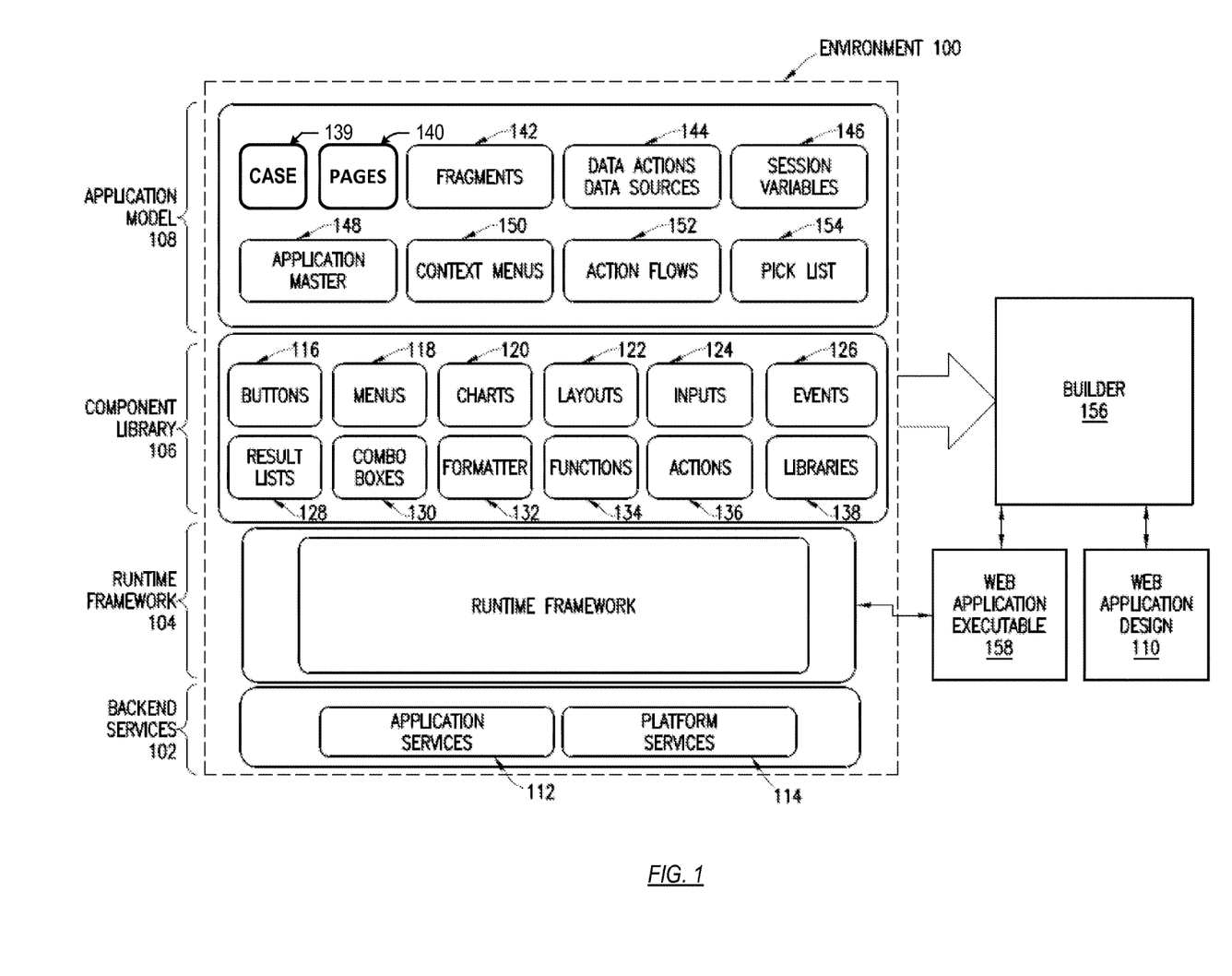
FIGS. 1, 2, 3, and 4 show schematic diagrams of systems in accordance with one or more embodiments of the technology.

FIG. 1 shows a schematic diagram of a system in accordance with one or more embodiments of the technology. Specifically, FIG. 1 shows a schematic diagram of an environment (100) for developing and executing a web application that implements the case fragment management. As shown in FIG. 1, the environment (100) includes backend services (102), a runtime framework (104), a component library (106), and an application model (108). Each of the aforementioned components is described below.

In one or more embodiments of the technology, backend services (102) are services that are not shown to the developer and ease the development of the web application design (110). The backend services (102) may include application services (112) and platform services (114). In one or more embodiments of the technology, the application services (112) allow a user interface based web application to be built on top of a generic model of a web application.

In one or more embodiments of the technology, the platform services (114) are services that manage the application for multiple different platforms. The multiple different platforms may have heterogeneous operating systems, devices, and/or display device sizes.

In one or more embodiments of the technology, the runtime framework (104) provides a runtime environment for a web application executable (158). Specifically, the runtime framework (104) manages the data and events of the executing web application executable (158). The runtime framework (104) is described in FIG. 2 and below.

In one or more embodiments of the technology, the component library (106) is a library of application components that a developer may add to the web application design (110). In other words, the developer may select components from the component library (106) to add functionality to the web application design (110). The component library (106) may include user interface components and processing components.

In one or more embodiments of the technology, user interface components are components that are displayed to an end user. In other words, instances of the user interface components are displayed on a display device. In one or more embodiments of the technology, the user interface components may include, but are not limited to, buttons (116) (e.g., radio buttons, common buttons), menus (118) (e.g., drop down menu, check boxes), charts (120), layouts (122), inputs (e.g., fields) (124) and combo boxes (130). User interface components in the component library may each be associated with a set of options. The set of options define the execution of the user interface component. Namely, the set of options define how a particular instance of the component is executed. Options associated with the user interface components may include formatting, any text that is displayed, any action that is to be performed when the user interface component is selected, other options, and/or any combination thereof. The action may be to: perform an operation on the page, transition to a specific static page, evaluate an expression to determine the page for transitioning, and/or perform another operation.

In one or more embodiments of the technology, the expression may specify one or more data sources and operations to perform on the data from one or more data sources. A data source is a location of data that is not within the expression. For example, the data source may be another portion of the application page or a data repository. For example, another portion of the application page may be a text field, drop down menu option, or other option. Data from the data source is used to evaluate the operations in the expression. For example, the operation may include a conditional statement based on the data obtained. By way of another example, the operation may be to perform an end user submitted action specified in another field of the page.

In one or more embodiments of the technology, the processing components are components that are hidden to the end user (i.e., are not displayed to the end user). For example, the processing components may include events (126), result lists (128), formatter (132), functions (134), actions (136), and libraries (138). Each of the processing components is discussed below.

Formatter (132) are instructions which enable arranging of the data in specific formats in accordance with one or more embodiments of the technology. A formatter may be application to number, date time values, other values, or a combination thereof. In accordance with one or more embodiments of the technology, functions (134) are the re-usable piece of code, which takes a set of inputs and return an output. Examples of functions include concat, substring, min, max, and other functions.

In accordance with one or more embodiments of the technology, an action (136) is a piece of reusable executable functionality that can be abstracted out of any particular component so that the action may be usefully shared among multiple pages and/or context menus. Example actions include update, delete, create, check-in, check-out, download, and other actions.

In accordance with one or more embodiments of the technology, a library (138) is a group of files which constitute utility, and infrastructure code. Example libraries include application startup code, action manager, type manager, utility, and logger. The processing components may also each be associated with a set of options that define how processing components are used.

In one or more embodiments of the technology, an application model (108) is a generic model for any web application. The application model includes a case (139), pages (140), fragments (142), data actions and data sources (144), session variables (146), application master (148), context menus (150), action flows (152), and a pick list (154). Each of these components of the application model is described below.

In one or more embodiments of the technology, a case (139) is a project (e.g., a software development project, building design and construction, car model development and manufacturing, patent application creation and prosecution, and other projects), a grouping of related work (e.g., child protective case), and/or other such collection. A case (139) may involve collaboration between multiple people using multiple documents. In other words, documents may be created over the course of the case, whereby the documents may have different access controls for different roles of users. The development environment includes functionality to provide a template for a case (139). Specifically, using the template, a user may create a case model definition that includes the documents, the access controls, and other parts of a case of a particular type. Further, using the development environment, a user may create case fragments and fragment expressions for the case model definition. A case fragment (142) represents at least a portion of a case. The case model definition and case fragments are discussed in further detail in FIG. 2 below.

Continuing with FIG. 1, a page (140) in the application model (108) is a template for a web page. In other words, a page in the application model (108) is a template for a complete and individual document that is displayable to the end user. Data actions and data sources (144) define the storage structure and storage location of the data and the actions to perform on the data.

Session variables (146) are the variables stored for a particular session between the end user and the web application executable (158). For example, session variables (146) may include connection variables and information about the end user, such as the user's credentials (e.g., user identifier), role of the end user, and other information.

The application master (148) defines the global look and feel of the web application in accordance with one or more embodiments of the technology. For example, the application master (148) may include various banners, menu items, fonts, colors, and other features that are displayed and surround the individual pages. By way of another example, the application master (148) may include a template on which the pages (140) are based.

Context menus (150) are instances of menus that are dependent on the context in which the menu is selected. For example, the context may be a particular user interface component that is selected, the page that is displayed, or another context. The context menu presents options that are specific to the particular context. The manner of selecting the context menu is not dependent on the context. Specifically, an end user may select the context menu in the same way and have different menu options presented based on the context.

Action flows (152) are sets of steps that are performed. In other words, each defines a set of steps to complete a task. For example, the may be to input a new person to a business' database, import a document into the business' database, copy documents, replace a user's forgotten password, or perform other tasks.

In one or more embodiments of the technology, a pick list (154) is a list of displayed items from which a set of items may be selected. In other words, more than one displayed item may be selected from a pick list.

The web application design (110) is a particular design of a web application created by a developer. Specifically, the web application design (110) includes instances of the components of the application model (108) and component library (106), may execute on the runtime framework (104) and use the backend services (102).

The web application design (110) is connected to a builder (156) in accordance with one or more embodiments of the technology. The builder (156) provides a user interface for a developer to create the web application design (110). In some embodiments, the developer does not need to know programming languages or other development knowledge to build the web application design. Rather, the builder (156) provides an interface by which the developer can primarily drag and drop components into a web application design (110), and enter parameters into fields to create the web application design (110). Thus, in some embodiments, a developer may be a business analyst rather than have any training in application development using a programming language.

The user interface of the builder (156) may include editor features and sub-systems. The editor features may include editors for modifying various aspects or views of the web application design, and/or a builder user interface to assist in the development of the web application design in accordance with one or more embodiments of the technology. For example, the editors may include business objects, documents, cases, searches, reports, pages, roles, apps, widgets, and process editors. The builder user interface may include a new artifact wizard, add-on top-level menu, add-on tool bar buttons, context menus, an artifacts properties page, and a model editor.

A process editor includes functionality to generate a process definition. A process definition is a definition of a business process, which may correspond to a real world business organization's workflow. In other words, the process definition is a set of activities or tasks that are orchestrated based on organization business rules or policies and produce a specific outcome. In one or more embodiments of the technology, tasks in the process definition may be executed by the user or the system by taking some actions on the business data. Execution of the tasks may be sequential and/or parallel. In one or more embodiments, a process definition is in an expression based language and includes logic for executing a process. In one or more embodiments of the technology, the ordering of instructions in a process may not be known until the process is executed.

The builder (156) also includes functionality to create the web application executable (158) from the web application design (110). In other words, the builder constructs the instructions for the web application executable from the web application design that is created using a drag and drop framework in accordance with one or more embodiments of the technology. The builder (156) may include components and functionality to perform artifact management, validate the web application, generate code, and package and deploy the web application. The builder (156) may also include components functionality to perform source control and project/library management.

Figure 2:
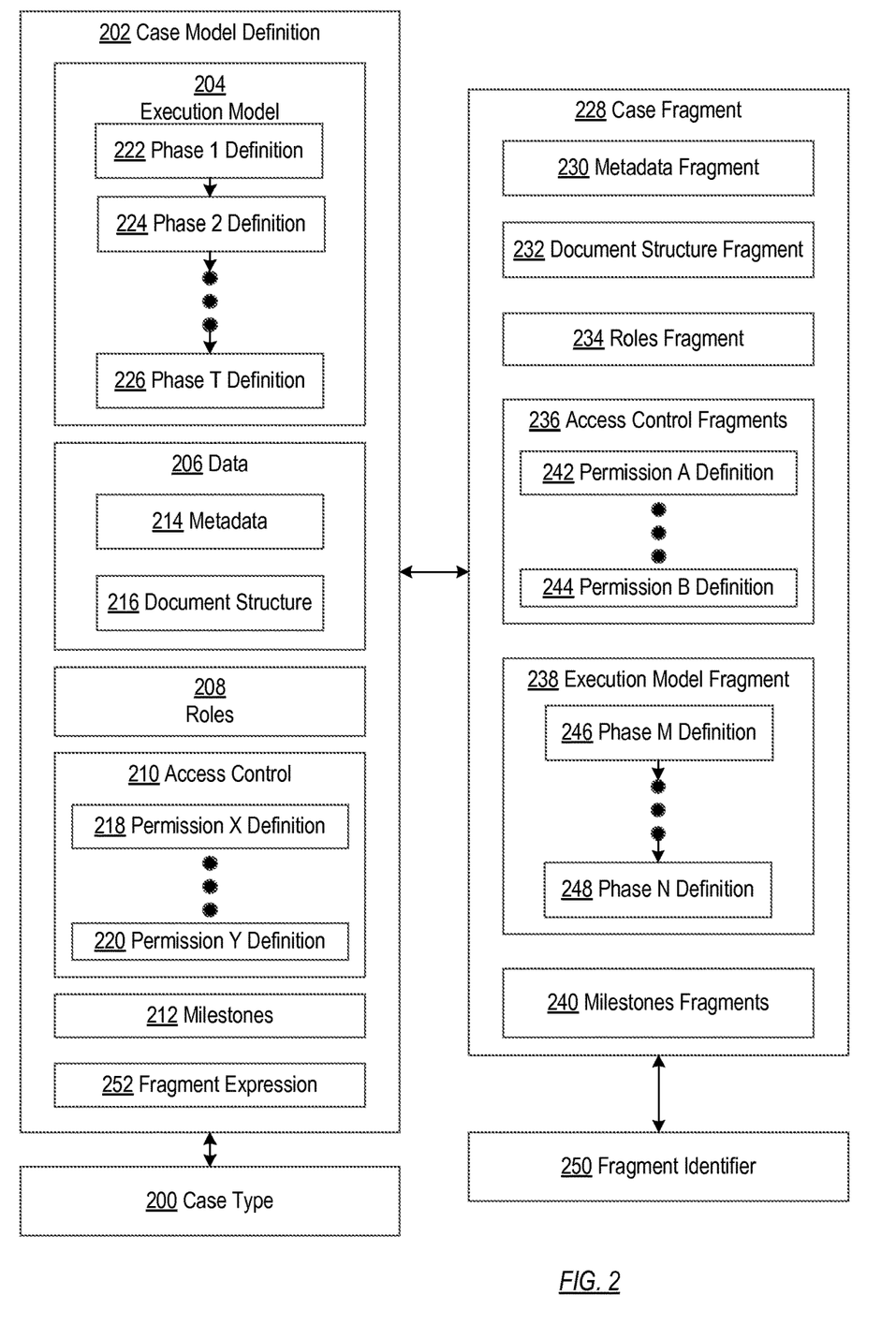

FIG. 2 shows a schematic diagram of a case model definition (202) and case fragments (228) in accordance with one or more embodiments of the technology. The case model definition (202) is related to a case type (200). The case type defines the type of case to which the case model definition is applicable. In other words, the case model definition may be defined for each instance of a case having the same case type. By way of an example, the case type may be "utility patent application," and the case model definition is defined for all utility patent applications involving a particular company and a particular firm. In the example, each instance of the case may be for a unique particular application for a particular technology. By way of another example, the case type may be "Sedan Cars" and the case model definition may be defined for models of an automaker's line that are sedans. In the example, a separate instance of the case may exist for each unique model in the automaker's line of sedans. The case type may be developer defined, and may represent the set of cases that use identical components for a case model definition (e.g., same documentation templates, same phases, etc.) in accordance with one or more embodiments of the technology.

As shown in FIG. 2, the case model definition (202) may include an execution model (204), data (206), roles (208), access control (210), execution model (204), milestones (212), and a fragment expression. The execution model (204) defines the path for executing the case. In other words, the execution model (204) defines how the case is processed. In one or more embodiments, the execution model (204) may span multiple users, software and hardware systems, and multiple companies. Thus, in such embodiments, the case management may include centralized tracking of the execution of the case.

In one or more embodiments of the technology, the execution model (204) includes a phase definition (e.g., phase 1 definition (222), phase 2 definition (224), phase T definition (226)) for each phase of execution. The phase definition defines parameters of the phase. In other words, the phase defines the stage of the case at a particular moment in time. In one or more embodiments, the case may be in only one phase at a time. Further, the phases may be defined linearly in one or more embodiments. In other words, in such embodiments, only a failure in the case may result in the case being reverted back to a prior phase. By way of an example, the phases of a software development project may include inception (e.g., project planning and gathering requirements), elaboration (e.g., architecting the design and performing low level collaboration), construction (e.g., analysis, implementation of the design, and testing), hardening (correcting errors and performing additional testing), and transition (e.g., deployment or release of the software development project). In one or more embodiments of the technology, the phases are defined in the case model definition as phase definitions.

Each phase definition may include parameters, such as the phase identifier, the triggering events to transition to the next phase, deadlines, the roles of users in the phase, and the operations performed in the phase. The deadlines may be defined relatively, such as relative to the start of the case or start of the phase. In one or more embodiments of the technology, the operations may be defined generically in the phase definition.

The data (206) includes data that is stored in a data repository (not shown) for the case. For example, the data (206) may include metadata (214) and document structure (216). Metadata is information about the case that may be used for tracking purposes. For example, the metadata may include fields for maintaining information about status, current phase (discussed below), case administrative data, role memberships, milestones, project instances acting on a case, ad hoc tasks, behaviors and policies, a list of related cases, and sub-cases. The case administrative data may include overall information about the case, such as Case number, Title/Subject of the case, and other such information. The role memberships indicate which users are members of which roles (discussed below) as the roles relate to the case. The status may be a single identifier indicating the current state of the case. The various states of the case may be dependent on the type of case and may be user defined. The current phase maintains a phase identifier of the phase of the case at a present time.

The document structure (216) is a hierarchy that identifies the types of documents and stores templates for the types of documents used in a case having the case type (200). For example, the document structure (216) may have a root node, case nodes that are intermediate nodes in the hierarchy, and leaf nodes that do not have children in the hierarchy. The root node is for the case. Case nodes that are direct children of the root node may be defined for sub-cases and for the main part of the case that are not sub-cases. The main part may include direct children nodes that are each correspond to different phases of the case. In other words, the different phases of the case may have distinct documents that are generated for the phase. Each phase may have a subhierarchy for the phase. In some embodiments, the document structure may also include information about the objects used for the case.

Continuing with FIG. 2, the roles (208) define the relationships of users to the case. In the case model definition (202), the roles are placeholders for various positions of the users in the case. For a case instance, the roles may be populated with a unique user identifier. Users may correspond to individual humans or to collections of humans. For example, a collection may be a company (e.g., supplier, distributor, vendor), a department of a company, or other collection. Roles may be used to define security and processes for the case. Example roles for a software development case model definition may be Project Manager Role, Architect Role, Team Lead Role, and Engineers Role. In one or more embodiments of the technology, roles may be defined hierarchically, such that roles may include sub-roles.

The case model definition (202) may further include access control definitions (210). Access control definitions define access to elements of a case and may be defined in terms of roles. In one or more embodiments of the technology, the access control definitions (210) may include permission definitions (e.g., permission X definition (218), permission Y definition (220)). A permission definition (e.g., permission X definition (218), permission Y definition (220)) defines a permission level for a set of circumstances. For example, a permission definition (e.g., permission X definition (218), permission Y definition (220)) may relate parameters of the permission with each other. For example, the parameters related to by the permission definition (e.g., permission X definition (218), permission Y definition (220)) may include the type of access allowed, the target of the access, the one or more role(s) that are permitted the access, the phase in which the access is allowed, and other such information. In one or more embodiments, permission definitions may be defined hierarchically. The parent permission definition (e.g., permission X definition (218), permission Y definition (220)) may provide default values for any parameter of a child. Thus, if a child permission definition has an undefined parameter, the parameter may be defined in the parent.

In one or more embodiments, the case model definition (202) and case fragments (228) are stored in a data repository (not shown). In one or more embodiments of the technology, the data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

In one or more embodiments of the technology, milestones (212) are events that may occur in a case. The milestone definition in the case model definition (202) define the type of milestones to achieve in the case. For example, the milestones may be the creation of the case, a phase transition, a phase completion, the completion of a document in a phase, the approval of a document in a phase, and other milestones. Milestones may be defined time based and/or may include a time parameter for achieving the milestones. Further, milestones may be created at design time or at runtime.

In one or more embodiments, although now shown in FIG. 2, the case model definition (202) may include one or more sub-case definitions. A sub-case definition is a case model definition that is a part of a parent case model definition. In other words, processing of a complex parent case may be partitioned into sub-cases, where the sub-cases have separate roles, access controls, execution models, etc.

In one or more embodiments of the technology, a case fragment (228) is a portion of a case model definition that is separately maintained and may be individually referenced by multiple case model definitions (e.g., case model definition (202)). Thus, the fragment expression may include one or more of the following: all or part of metadata for a case (e.g., metadata fragment (230)), all or part of a document structure (e.g., document structure fragment (232)), all or part of a roles definition (e.g., roles fragment (234)), all or part of an access control definition (e.g., access control definition fragment (236)), all or part of an execution model (e.g., execution model fragment (238)), and all or part of the milestones (e.g., milestone fragments (240)). For example, for an access control fragment (236), the case fragment may include a strict subset of permission definitions (e.g., permission definitions (e.g., permission A definition (242), permission B definition (244))) for a case. For example, the subset may be for particular roles, or other aspects. By way of another example, the execution model fragment may include only a strict subset of the phase definitions (e.g., phase definitions (e.g., phase M definition (246), phase N definition (248))). In at least some embodiments, a case fragment is different from a case model definition in that the case fragment may be incorporated in the case model definition, and define only a portion of a case model definition. In other words, in isolation, a case fragment (228) is an incomplete definition of a case model. Although FIG. 2 shows a single case fragment, multiple case fragments may be defined in the case model definition.

Each case fragment (228) may have a corresponding unique fragment identifier (250) in accordance with one or more embodiments of the technology. The fragment identifier (250) uniquely identifies the fragment in the set of possible fragments. For example, the fragment identifier (250) may be an alphanumeric identifier.

Returning to the case model definition (202) in FIG. 2, the case model definition (202) may additionally include a fragment expression (252). A fragment expression (252) is an expression for selecting a case fragment (e.g., case fragment (228)) from the set of case fragments. In particular, a fragment expression (252) is a function on data from one or more data sources that maps the data to an identifier of a case fragment (e.g., fragment identifier (250)). The fragment expression (252) may include references to one or more data sources and describe one or more operations to perform on data from the one data sources. The data sources may be inline sources (e.g., graphical user interface widgets, tasks and events, roles and permissions, metadata such as originator of the case, deadlines to complete the case, and any other source of data), context information for the case (e.g., environmental information, such as originating company, user identifier of a user, and any other state information describing the processing environment of the case). In other embodiments, the fragment expression may be a simple assignment operation (e.g., case fragment=fragment identifier 1234). Regardless of whether the fragment expression is a function of data sources, the output of the fragment expression is an identifier of a case fragment.

Although FIG. 2 shows the fragment expression as external to the various components of the case model expression, one or more case fragment expressions may be defined within a component of a case model definition. For example, if a case fragment only includes permission definitions (e.g., permission definitions (e.g., permission A definition (242), permission B definition (244))), the access control definition (210) may include the corresponding case fragment expression that references the case fragment. Similarly, a case fragment that only includes a document structure fragment may have a corresponding case fragment expression in the node of the document structure (216) to which the document structure fragment is to be added. Thus, the case fragment expression may be defined in various portions of a case.

Figure 3:
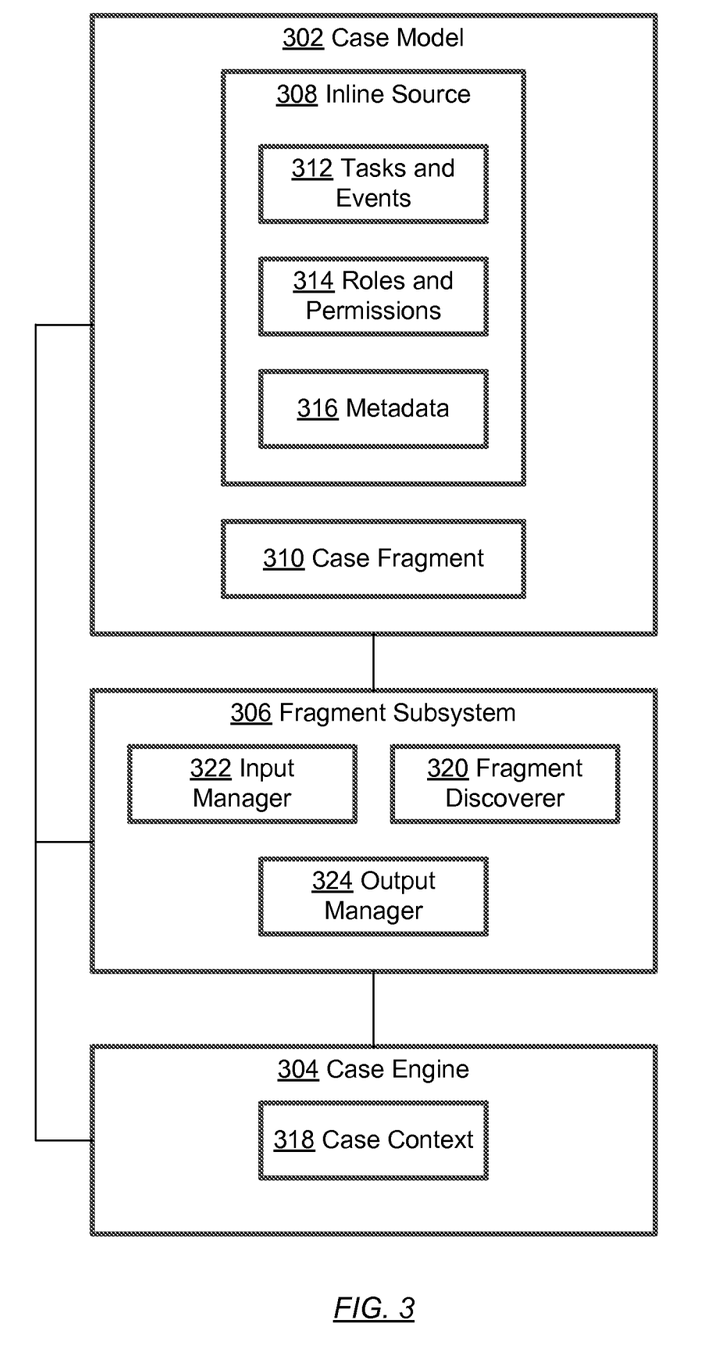

As discussed above, the development environment of FIG. 1 provides a mechanism to create a case model definition and case fragment defined in FIG. 2. FIG. 3 shows a schematic diagram of a system to instantiate a case using the case model definition and case fragment in FIG. 2 in accordance with one or more embodiments of the technology.

As shown in FIG. 3, a case model (302) is connected to a fragment subsystem (306) and a case engine (304). The case model is an instance of a case model definition, such as the case model definition in FIG. 2. In particular, in the case model (302), various parameters of the case model definition may be resolved. For example, the deadlines may be changed from relative deadlines that are defined with respect to the start of the case to the actual calendar deadlines. By way of another example, the case model (302) may relate user identifiers to roles. Further, the name of the case, and other information specific to the case may be populated in the case model.

The case model (302) may include inline sources (308) and a case fragment (310) in accordance with one or more embodiments of the technology. The inline sources (308) are information that is stored within the case model (302) that may be used to identify the case fragment using the case fragment expression. For example, as shown in FIG. 3 and discussed above, the inline sources may include tasks and events (312), roles and permissions (314), and metadata (316). The tasks may be operations defined for particular phases. The tasks and events (312), roles and permissions (314), and metadata (316) are discussed above with reference to FIG. 2. The case fragment (310) in FIG. 3 may be an instance of the case fragment in FIG. 2. In particular, the case fragment (310) is the identified case fragment from a case fragment expression in FIG. 3 and is populated into the case model (302). Further, similar to the case model, when the case fragment is populated into the model, various components of the case fragment may be resolved as discussed above (e.g., user identifiers may be related to roles defined in the case fragment, etc.).

In one or more embodiments of the technology, the case engine (304) includes functionality to maintain the case context (318) and execute the case. The case context is discussed above with reference to FIG. 2. The case engine (304) is discussed in additional detail in FIG. 4.

The fragment subsystem (306) may be hardware, software, firmware, or a combination thereof that includes functionality to manage the selection and execution of a case fragment based on the fragment expression. In particular, the fragment subsystem (306) may include a fragment discoverer (320) that includes functionality to select the case fragment based on the fragment expression (320).

The fragment subsystem (306) may further include an input manager (322) to manage the input and an output manager (324) to manage the output from the fragment discoverer (320). Managing the input and output may include resolving references to identify input and output locations, transforming the input and/or output, such as changing the data type, and performing other operations.

Figure 4:
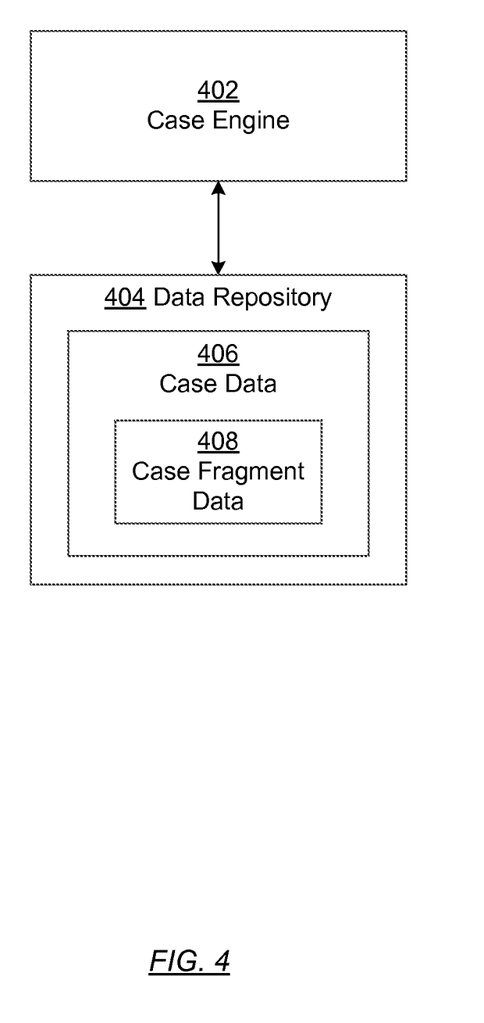

As discussed above the case model may be used to manage and track the case. In other words, the case model provides a technique for centralized management and tracking of cases. FIG. 4 shows a schematic diagram of a system for execution of a case in accordance with one or more embodiments of the technology. In the diagram, a case engine (402) is connected to a data repository (404). The case engine (402) may correspond to hardware, software, firmware, or any combination thereof that includes functionality to manage a case. For example, the case engine (402) may provide centralized tracking of a case that is configured to receive updates from disparate computing devices, software, and companies, maintain current case data (406) and control access to the case data (406). The data repository (404) is any type of storage unit or device for storing case data (406). The case data (406) is any populated data in a case model definition that is particular to a case. For example, the case data may be a populated case model. Thus, the case data may include particular documents generated from document templates in the case model, records of communications between users, version control information, status and phase information, and other information particular to the execution of the case. The case data (406) may include case fragment data (408). The case fragment data (408) may be part of the case data (406) that is indistinguishable from the case data. In other embodiments, the case fragment data (408) is marked as fragment data in the data repository (404). The case fragment data (408) is data that is populated into the case fragment.

As shown, one or more embodiments provide a set of components for creating a case model definition, generating a case model from the case model definition, and using the case model to manage a case during runtime. While FIGS. 1-4 show a configuration of components, other configurations may be used without departing from the scope of the technology. For example, various components may be combined to create a single component. As another example, the functionality performed by a single component may be performed by two or more components.

Figure 5:
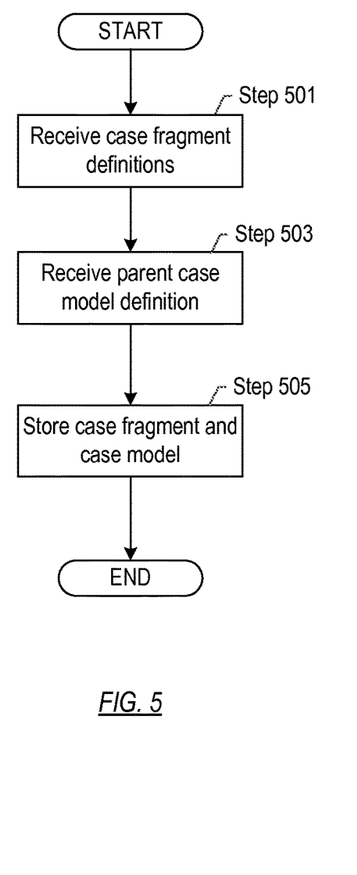
FIGS. 5 and 6 show flowcharts in accordance with one or more embodiments of the technology.
Figure 6:
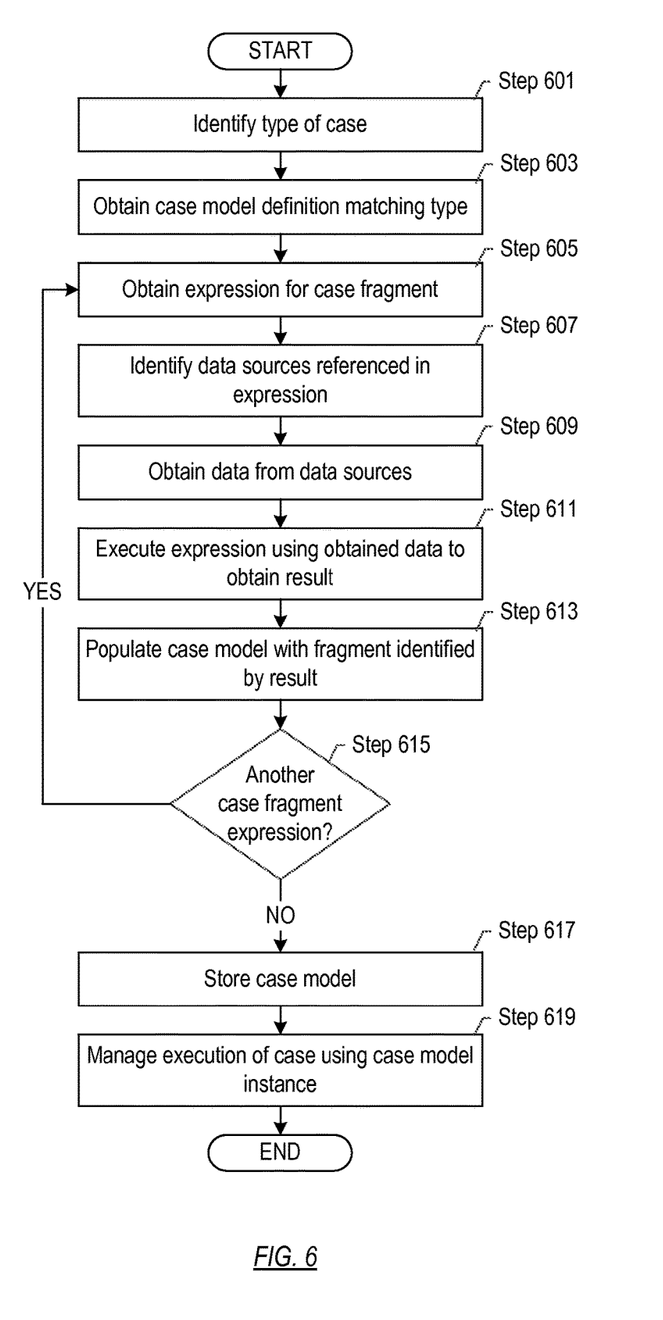

FIGS. 5 and 6 show flowcharts in accordance with one or more embodiments of the technology. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the technology. By way of an example, determination steps may not require a processor to process an instruction unless an interrupt is received to signify that condition exists in accordance with one or more embodiments of the technology. As another example, determination steps may be performed by performing a test, such as checking a data value to test whether the value is consistent with the tested condition in accordance with one or more embodiments of the technology.

FIG. 5 shows a flowchart for generating a case model definition in accordance with one or more embodiments of the technology. In Step 501, one or more case fragment definitions are received in accordance with one or more embodiments of the technology. In Step 503, one or more case model definitions are received in accordance with one or more embodiments of the technology. The generating of the case fragment definitions may correspond to or be independent of the generating of the case model definitions. For example, while or after generating a case model definition, the developer may mark one or more portions of the case model definition to extract as a separate case fragment. In such a scenario, the developer defines the case model definition, or a portion thereof, and then specifies the portion belonging to separate fragments in accordance with one or more embodiments of the technology. The development environment may extract the portion corresponding to the case fragment and store the portion separately with a developer assigned or system assigned fragment identifier.

By way of another example, the developer may start developing a case fragment independent of the case model definition. In other words, the developer may identify portions of a case that are common to multiple case types and set the common portions as corresponding to a case fragment by using a corresponding widget in the development environment for defining case fragments. Thus, one or more embodiments allow for a top down and a bottom up approach to specifying case fragment definitions.

In particular, the development environment shown in FIG. 1 facilitates an expression based development of a case. Thus, using the developer tools offered by the development environment, a user may drag and drop components of a case model to define various components of the case model definition. Some of the components may have predefined templates and logic. In such a scenario, once dragged into the web application design, the user may submit values of various parameters of the components. For example, the user may submit a unique identifier, any references, or any other information into fields of the widget.

Within the developer environment, the builder may maintain an internal version of the case model definition and fragment definition, such as in extensible markup language (XML) format that describes the case model definition and fragment definition.

Thus, receiving the case fragment definition and the case model definition may include receiving the developer's input through the graphical user interface of the developer environment and generating the internal version of the case model definition and case fragment definition while the case fragment definition and case model definition are being developed. In one or more embodiments of the technology, the developer may generate multiple case fragment definitions. Further, in accordance with one or more embodiments of the technology, one or more of the case fragment definitions may be copied from other cases or case fragments. For example, the developer may select a portion of a case or case fragment using the graphical user interface of the developer environment and copy the selection to a new definition. The developer may make any further modifications of the copied case fragment definition(s).

In one or more embodiments, as part of generating the parent case model definition, the developer may include a fragment expression. In other words, the developer may include a placeholder in the parent case model definition for a case fragment and specify the fragment expression using an expression based language. Specifying the fragment expression may include defining one or more operations and sources of data for selecting the case fragment. The developer may also define a default case fragment definition. Steps 501 and 503 may be performed multiple times to create additional case model definitions and fragment definitions.

In Step 505, the case fragment definition and the case model definition are stored in accordance with one or more embodiments of the technology. In particular, the case fragment definition and the case model definition are stored in the data repository. In one or more embodiments, when the case model definition is stored, the case model definition is related, in the storage, with an identifier of the case type to which the case model relates. Similarly, the case fragment may be related to a fragment identifier in storage.

As discussed above, FIG. 5 shows a flowchart for generating a case model definition and a fragment definition in accordance with one or more embodiments of the technology. FIG. 6 shows a flowchart for using the definitions generated in FIG. 5 to create a case model for a particular case. The Steps of FIG. 6 may be performed, for example, using the diagram of FIG. 3.

In Step 601, the type of case is identified in accordance with one or more embodiments of the technology. Identifying the type of case may be performed automatically, such as by using machine learning on initial documentation starting the case, or based on manual user input. For example, a user may, in a web application, select a field that expressly or inherently relates the users input or submission to the type of case.

In Step 603, the case model definition that matches the type is obtained in accordance with one or more embodiments of the technology. In other words, the data repository may be queried with a unique identifier of the case type. The data repository may respond to the query with the case model definition or a location of the case model definition. The case engine may create an instance of the case model definition (i.e., a case model) for the case and start populating the case model with information, such as information gathered from one or more users.

In Step 605, an expression for a case fragment is obtained in accordance with one or more embodiments of the technology. In other words, during processing of the case model definition, a case fragment expression is obtained as the next portion of the case model definition to process.

In Step 607, data sources referenced in the case fragment expression are identified in accordance with one or more embodiments of the technology. In one or more embodiments of the technology, the expression may reference inline data sources and/or external data sources.

In Step 609, data is obtained from the one or more data sources according to the case fragment expression. For example, the data may be obtained by accessing inline data sources, a data repository to context data, other data source, or a combination thereof.

In Step 611, the expression is executed using the obtained data to obtain a result in accordance with one or more embodiments of the technology. Executing the expression may include performing one or more operations in the expression. For example, the operations may include comparing data from a data source to a value, and selecting a case fragment if the data matches. As a result of executing the expression, a result is obtained. The result may be a unique identifier of an existing case fragment, a unique identifier of the default case fragment, an incorrect identifier, or an error identifier in accordance with one or more embodiments of the technology.

In Step 613, the case model is populated with the fragment identified by the result in accordance with one or more embodiments of the technology. In other words, an instance of the case fragment definition identified by the case fragment identifier is created and added to the case model. The corresponding fields of the case fragment may be populated, as discussed above, using user data. Additional input may be added during the execution of the case model.

In Step 615, a determination is made whether another case fragment expression exists in accordance with one or more embodiments of the technology. If another case fragment expression exists, the flow may return to Step 605 to process the next case fragment expression.

In Step 617, the case model is stored in accordance with one or more embodiments of the technology. In one or more embodiments, the storage is performed in a centralized data repository in order to allow multiple entities to populate the case model with information and documents for the case.

In Step 619, execution of the case is managed using the case model in accordance with one or more embodiments of the technology. Managing execution may be performed as follows. In one or more embodiments, the case engine may receive various access requests from various users to access parts of the case. In response, the case engine may compare a user's role, the type of access being requested, and other parameters of the request to the permissions. The case engine may allow the access when the user has the permissions to access under the constraints in the case model. Further, managing a case may include generating new documents from templates defined in the case model definition, facilitating communication between users, receiving approval/disapproval of documents, automatically maintaining state information, tracking the achievement of milestones or when the achievement is past due, changing the phases according to the phase definitions, and performing other such operations.

Figure 7:
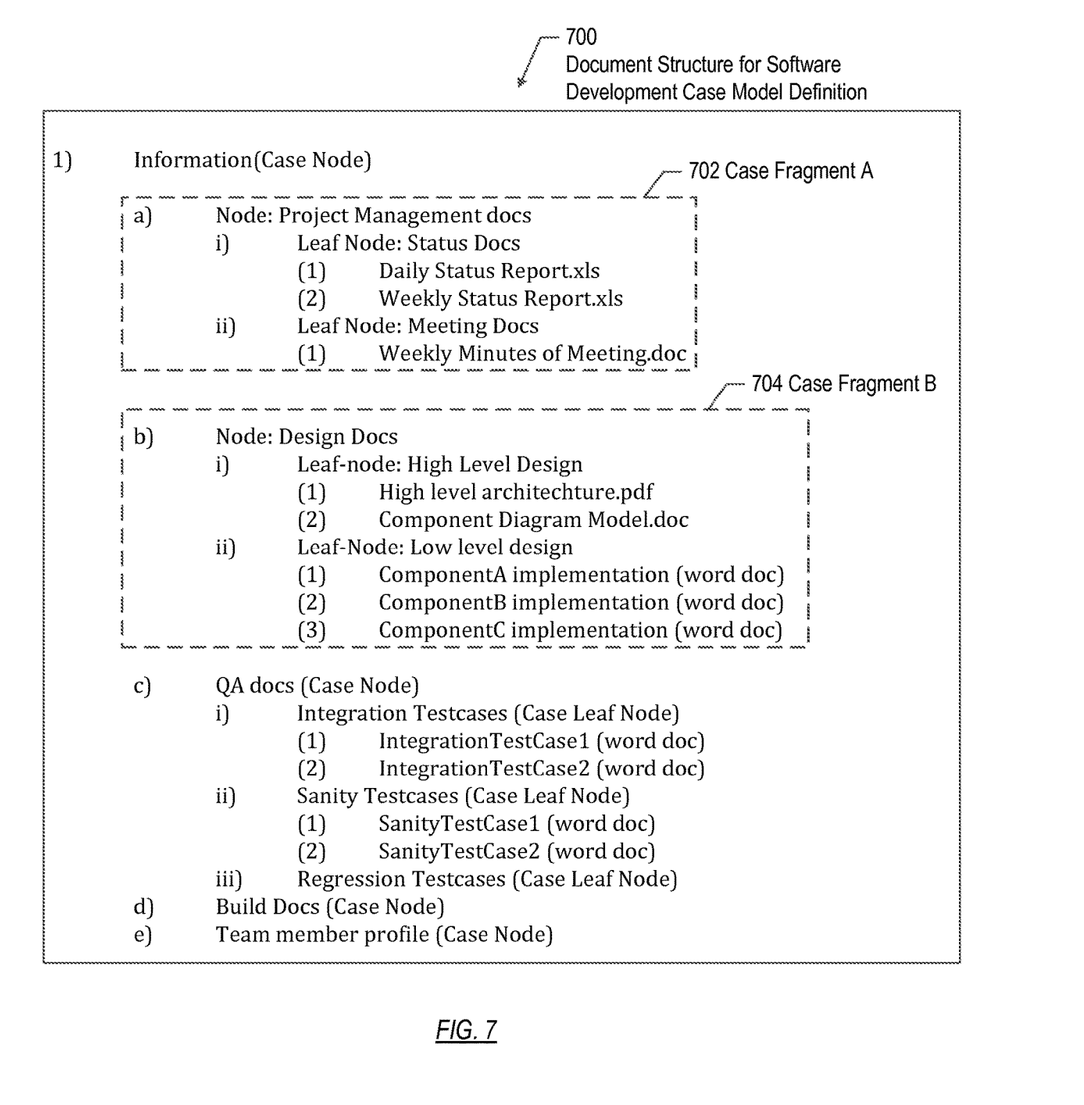
FIGS. 7 and 8 show an example in accordance with one or more embodiments of the technology.
Figure 8:
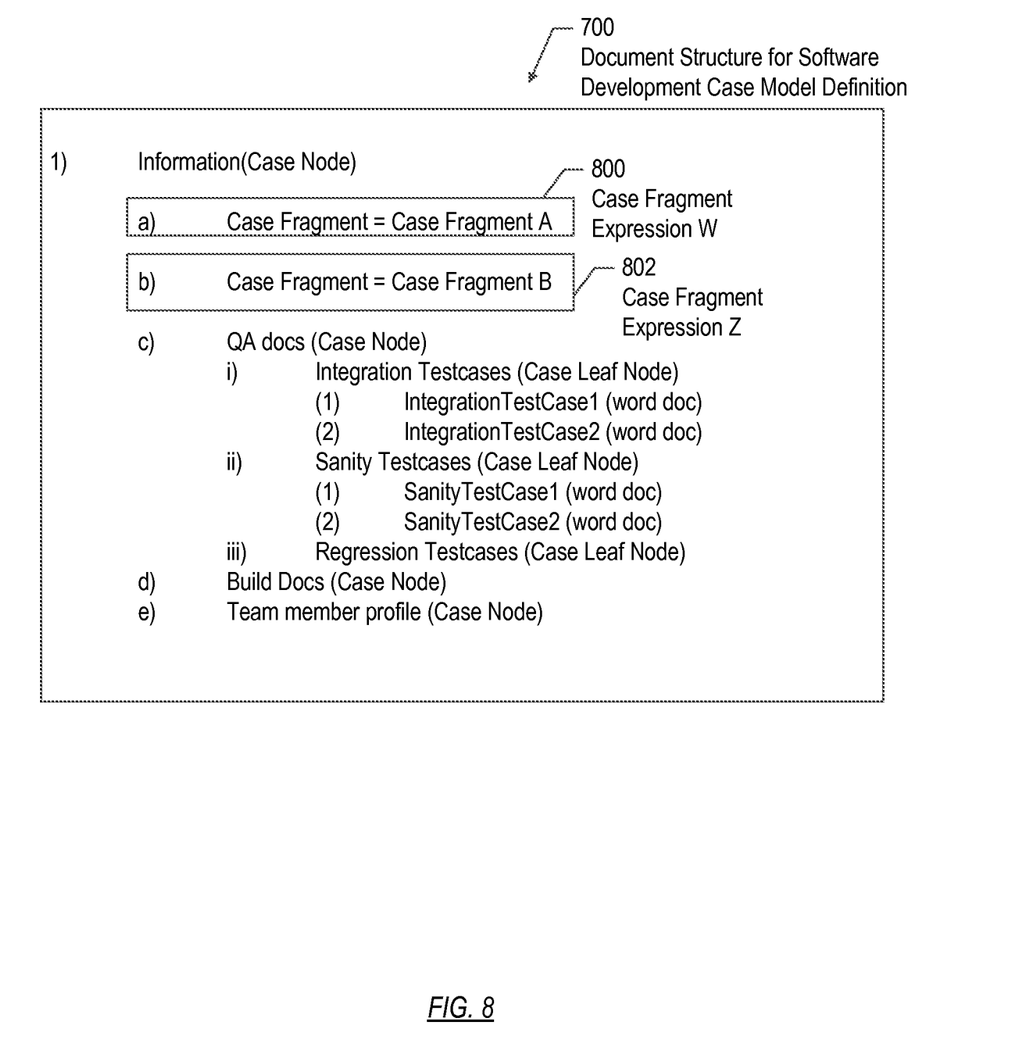

FIGS. 7 and 8 show an example in accordance with one or more embodiments of the technology. The following example is for explanatory purposes only and not intended to limit the scope of the technology. FIG. 7 shows an example of a portion of a document structure for a local software development case model definition (700). In other words, the local document structure is defined for any software development project for software performed on a local machine. As shown in FIG. 7, the document structure may define multiple document templates that are used, such as status reports, testing cases, meeting minutes, and other such structures. While generating the case model definition and the document structure, the developer may determine that portion A of the document structure and portion B of the document structure are both common amongst multiple types of cases for software development. For example, although the current case is for a local application, the particular portions denoted by the developer may also be used to create web applications. Thus, the developer selects portion A as Case fragment A (702) and portion B as Case Fragment B (704). Further, to ease later development, the developer may extract case fragment A (702) and case fragment B (704) as separate entities in storage from the case model definition.

As shown in FIG. 8, the developer replaces case fragment A (702) and case fragment B (704) from FIG. 7 with fragment expressions in accordance with one or more embodiments of the technology. In other words, the portion of the case model definition for case fragment A is referenced by case fragment expression W (800). Similarly, the portion of the case model definition for case fragment B is referenced by case fragment expression Z (802). Thus, the case fragment may be updated independently of the case model definitions and the update may be propagated to multiple case fragments when the case fragments are created.

The following is another example for modeling a case using case model definitions and case fragments in accordance with one or more embodiments of the technology. In the following example, consider the scenario in which a company defines case definition models to model the path of creating a patent application from description to filing. In particular, the company is interested in creating a case model to model the processes of design patent application and a utility patent application. Because design patent applications are different than utility patent applications, the company creates a separate case model definition for each type. For both types of patent applications, the following phases may exist.

1) Inventors generate technology disclosure form
2) Company internally reviews disclosure form
3) Company sends disclosure form to outside attorney
4) Outside attorney contacts inventors
5) Outside attorney prepares patent application and FIGS.
6) Inventors review application, which may include communication and revisions back and forth with outside attorney
8) Company reviews application
9) Inventors sign declaration and assignment
10) Application is filed.

However, because design applications are heavily dependent on Figures, the outside attorney adds an additional phase between phrases 5 and 6. The additional phase is to obtain a third party draftsman to draft the Figures of the design. The phase with the draftsman may include multiple steps of an initial consultation, drafting Figures by the draftsman, and review by outside attorney.

In order to define the case model definitions, the following operations may be performed. A first phase fragment would exist for phase 1-5 and another phase fragment would exist for phases 6-7. A document structure fragment would exist that has the technology disclosure form, the declaration and assignment. A roles fragment and access control definition fragment would exist for having the legal department, inventors, outside attorney, and other such people that are common on both. The above fragments may exist in a single fragment definition or in separate fragment definitions.

Further the developer defines (1) a utility application case model and (2) a design application case model. (1) The utility application case model may include one or more fragment expressions to reference the above fragments. The utility application case model may also include the particular utility application template in the document structure. (2) The design application case model may also include one or more fragment expressions to reference the above fragments. The design application case model may include the particular design application template in the document structure, a role definition for the draftsman, an access control definition for the draftsman to access the drawings, and include the specific phases between phase 5 and 6 above for communicating with the draftsman.

Rather than separately defining the case fragments, the developer may specify that certain portions of the case model definition for the utility application are fragments. The development environment may extract the fragment definitions and assign fragment identifiers to the fragment definitions. Thereafter, when defining the design application case model, the developer may reference via fragment expressions, the particular case fragment definitions.

Next consider the scenario in which an inventor has a new technology. The inventor may initiate the creation of a new case instance for a utility application. At this stage (i.e., the initiation), the runtime system obtains the utility application case model definitions and resolves the fragments (i.e., identifies the fragments to copy) to create the case model that is populated with the particular document instances (e.g., blank disclosure form, patent application), maintains tracking for the phase, keeps track of which users are in which roles with respect to the case, and stores other like data.

After the case instance is created, the inventor starts populating the blank disclosure form with information about this technology and the case instance proceeds forward until the application is filed. The case engine may track the case instance, manage the access controls and document creation, and perform other such tasks.

If a case fragment is updated at the design time, then it is automatically propagated to all case model definitions, because all case model definitions only have a reference to the fragment, rather than the fragment itself in accordance with one or more embodiments of the technology. However, at the case model management time, any updates to the fragment will not affect the individual instances created in one or more embodiments of the technology.

Figure 9:
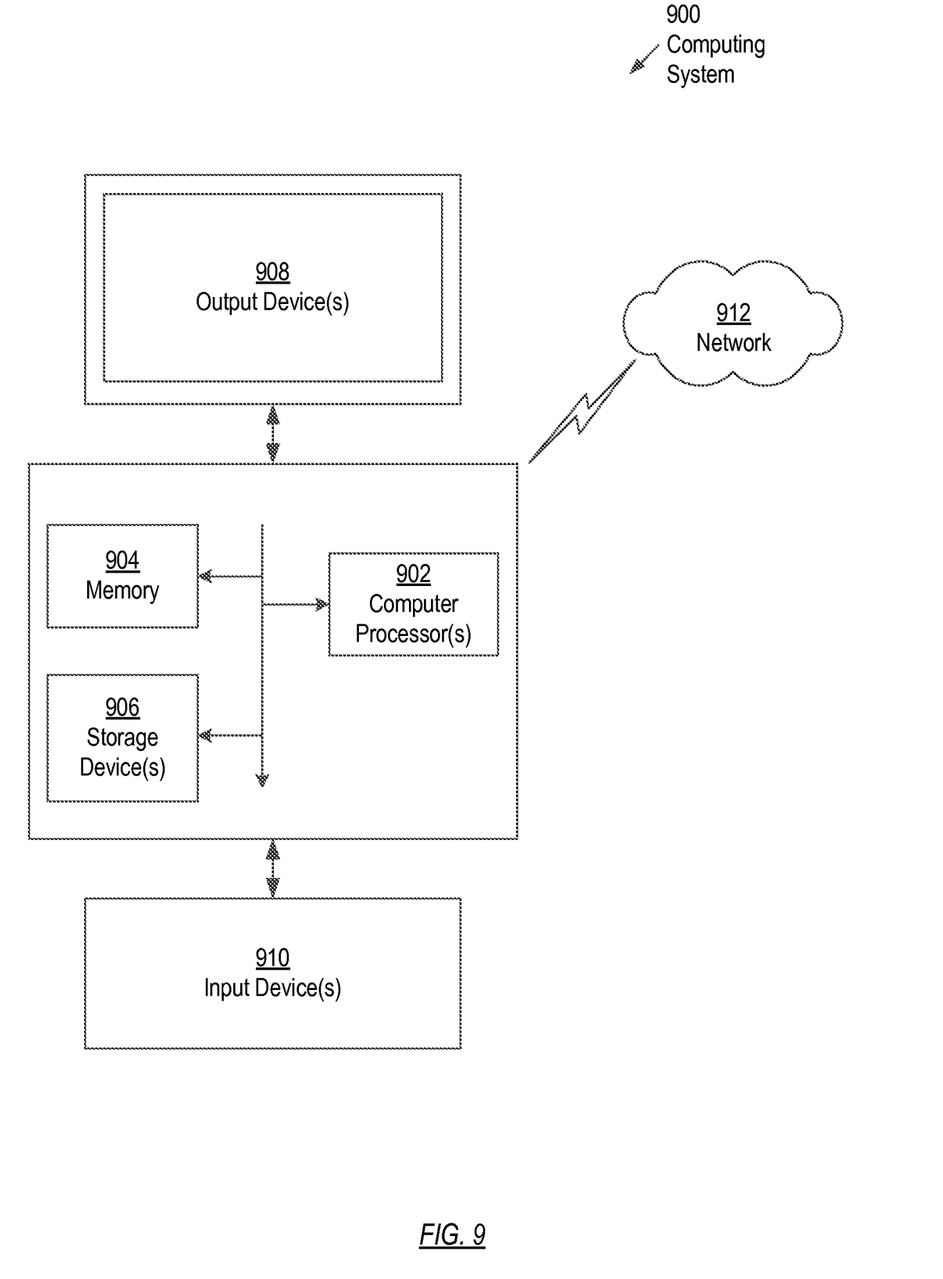
FIG. 9 shows a computing system in accordance with one or more embodiments of the technology.

Embodiments of the technology may be implemented on a computing system. Any combination of mobile, desktop, server, embedded, or other types of hardware may be used. For example, as shown in FIG. 9, the computing system (900) may include one or more computer processor(s) (902), associated memory (904) (e.g., random access memory (RAM), cache memory, flash memory, etc.), one or more storage device(s) (906) (e.g., a hard disk, an optical drive such as a compact disk (CD) drive or digital versatile disk (DVD) drive, a flash memory stick, etc.), and numerous other elements and functionalities. The computer processor (s) (902) may be an integrated circuit for processing instructions. For example, the computer processor(s) may be one or more cores, or micro-cores of a processor. The computing system (900) may also include one or more input device(s) (910), such as a touchscreen, keyboard, mouse, microphone, touchpad, electronic pen, or any other type of input device. Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (900) may be connected to a network (912) (e.g., a local area network (LAN), a wide area network (WAN) such as the Internet, mobile network, or any other type of network) via a network interface connection (not shown). The input and output device(s) may be locally or remotely (e.g., via the network (912)) connected to the computer processor(s) (902), memory (904), and storage device(s) (906). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the technology.

Further, one or more elements of the aforementioned computing system (900) may be located at a remote location and connected to the other elements over a network (912). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for case fragment management comprising:
maintaining a plurality of case fragments, wherein each case fragment in the plurality of case fragments is a case model definition portion and is associated with a respective case fragment identifier;
obtaining, by a processor, a case model definition for a case, the case model definition including a case fragment expression that is executable to output a first case fragment identifier as a function on data from a first data source;
generating, by the processor, a case model from the case model definition, wherein generating the case model comprises:
obtaining the case fragment expression from the case model definition;
executing the case fragment expression using first data gathered from the first data source to determine the first case fragment identifier as a result of the executing the case fragment expression, using the first data as input to the executing;
selecting, from the plurality of case fragments, a first case fragment identified by the first case fragment identifier, the first case fragment comprising a first portion of a document structure definition;
populating the case model with the selected first case fragment by:
creating a first portion of a document structure according to the first portion of the document structure definition, and
storing the first portion of the document structure in a data repository;
creating a second portion of the document structure according to a second portion of the document structure definition in the case model definition; and
storing the second portion of the document structure in the data repository; and
storing the case model.

2. The method of claim 1, further comprising:
managing performance of the case using the case model.

3. The method of claim 2, wherein the first case fragment comprises a first roles definition and a first access control definition, wherein managing performance of the case comprises:
administering access to a plurality of documents in the case according to:
the first roles definition and first access control definition, and
a second roles definition and a second access control definition located in the case model definition.

4. The method of claim 2, wherein the first case fragment comprises a first portion of a plurality of phases definition, and wherein managing performance of the case comprises:
transitioning through a plurality of phases using:
the first portion of the plurality of phases definition, and
a second portion of the plurality of phases definition located in the case model definition.

5. The method of claim 1, wherein executing the case fragment expression comprises:
performing an operation in the case fragment expression that identifies the first case fragment identifier.

6. The method of claim 5, further comprising:
gathering the first data from an internal source within the case,
wherein performing the operation uses the first data from the internal source.

7. The method of claim 6, further comprising:
gathering the first data from a case context of the case, wherein performing the operation uses the first data from the case context.

8. The method of claim 1, further comp sing:
executing the case fragment expression using second data gathered from a second data source to obtain a second case fragment identifier; and
selecting, from the plurality of case fragments, a second case fragment corresponding to the second case fragment identifier.

9. A system for case fragment management comprising:
a data repository for storing a plurality of case fragments, wherein each case fragment in the plurality of case fragments a case model definition portion and is associated with a respective case fragment identifier;
a computer processor; and
memory comprising instructions executable on the computer processor to provide a fragment subsystem configured to:
  obtain a case model definition for a case, the case model definition including a case fragment expression that is executable to output a first case fragment identifier as a function on data from a first data source;
  generate a case model from the case model definition, wherein generating the case model comprises:
    obtaining the case fragment expression from the case model definition;
    executing the case fragment expression using first data gathered from the first data source to determine the first case fragment identifier as a result of the executing the case fragment expression, using the first data as input to the executing;
    selecting, from the plurality of case fragments, a first case fragment identified by the first case fragment identifier, the first case fragment comprising a first portion of a document structure definition;
    populating the case model with the selected first case fragment by:
      creating a first portion of a document structure according to the first portion of the document structure definition, and
      storing the first portion of the document structure in the data repository;
      creating a second portion of the document structure according to a second portion of the document structure definition in the case model definition; and
      storing the second portion of the document structure in the data repository; and
  store the case model.

10. The system of claim 9, wherein the memory further comprises instructions executable on the computer processor to provide a case engine configured to;
manage performance of the case using the case model.

11. The system of claim 10, wherein the first case fragment comprises a first roles definition and a first access control definition, wherein managing performance of the case comprises;
administering access to a plurality of documents in the case according to:
  the first roles definition and first access control definition, and
  a second roles definition and a second access control definition located in the case model definition.

12. The system of claim 10, wherein the first case fragment, comprises a first portion of a plurality of phases definition, and wherein managing performance of the case comprises:
transitioning through a plurality of phases using:
  the first portion of the plurality of phases definition, and
  a second portion of the plurality of phases definition located in the case model definition.

13. The system of claim 9, wherein executing the case fragment expression comprises;
performing an operation in the case fragment expression that identifies the first case fragment identifier.

14. The system of claim 9, wherein the fragment subsystem is further configured to;
execute the case fragment expression using second data gathered from a second data source to obtain a second case fragment identifier; and
select, from the plurality of case fragments, a second case fragment corresponding to the second case fragment identifier.

15. A non-transitory computer readable medium for case fragment management comprising computer readable program code for:
obtaining a case model definition for a case, the case model definition including a case fragment expression that is executable to output a first case fragment identifier as a function on data from a first data source;
generating a case model from the case model definition, wherein generating the case model comprises:
  obtaining the case fragment expression from the case model definition;
  executing the case fragment expression using first data gathered from a data source to determine the first case fragment identifier as a result of the executing the case fragment expression, using the first data as input to the executing;
  selecting, from a plurality of case fragments, a first case fragment identified by the first case fragment identifier, the first case fragment comprising a first portion of a document structure definition, wherein each case fragment in the plurality of case fragments is a case model definition portion and is associated with a respective case fragment identifier;
  populating the case model with the selected first case fragment by:
    creating a first portion of a document structure according to the first portion of the document structure definition, and
    storing the first portion of the document structure in a data repository;
    creating a second portion of the document structure according to a second portion of the document structure definition in the case model definition; and
    storing the second portion of the document structure in the data repository; and
storing the case model.

16. The non-transitory computer readable medium of claim 15, further comprising computer readable program code for:
managing performance of the case using the case model.

17. The method of claim 1, wherein generating the case model comprises generating the case model as a runtime instance of the case model definition.

18. The system of claim 9, wherein the fragment subsystem is configured to generate the case model as a runtime instance of the case model definition.

19. The non-transitory computer readable medium of claim 15, wherein generating the case model from the case model definition comprises generating the case model as a runtime instance of the case model definition.

\* \* \* \* \*